United States Patent [19]
Vicard

[11] Patent Number: 5,063,034
[45] Date of Patent: Nov. 5, 1991

[54] PROCESS FOR PURIFYING BY THE WET METHOD FUMES CONTAINING NITROGEN OXIDES

[75] Inventor: Jean-Francois Vicard, Lyons, France

[73] Assignee: Societe LAB, Lyons, France

[21] Appl. No.: 479,517

[22] Filed: Feb. 13, 1990

[30] Foreign Application Priority Data

Feb. 23, 1989 [FR] France .................. 89 02617

[51] Int. Cl.$^5$ .............................. C01B 21/00
[52] U.S. Cl. .................................. 423/235
[58] Field of Search .............. 423/235, 235 D, 239, 423/239 A

[56] References Cited

U.S. PATENT DOCUMENTS

| | | | |
|---|---|---|---|
| 4,029,739 | 6/1977 | Senjo et al. | 423/235 |
| 4,055,624 | 10/1977 | Yoshida et al. | 423/235 |

FOREIGN PATENT DOCUMENTS

| | | | |
|---|---|---|---|
| 3507690 | 9/1986 | Fed. Rep. of Germany . | |
| 51-100966 | 9/1976 | Japan | 423/235 |
| 56-126431 | 10/1981 | Japan | 423/235 |

*Primary Examiner*—Gregory A. Heller
*Attorney, Agent, or Firm*—Dowell & Dowell

[57] ABSTRACT

A process for purifying, by the wet method, fumes containing nitrogen oxides in which nitrogen monoxide is oxidized by an oxidizing agent into nitrogen dioxide which is itself reduced to nitrogen by using the reducing properties of sulfur dioxide present in the fumes and wherein the reduction is effected with the aid of an intermediate agent which prevents the transfer of nitrogen oxides in the form of nitrates to the effluent of the purification process.

8 Claims, 1 Drawing Sheet

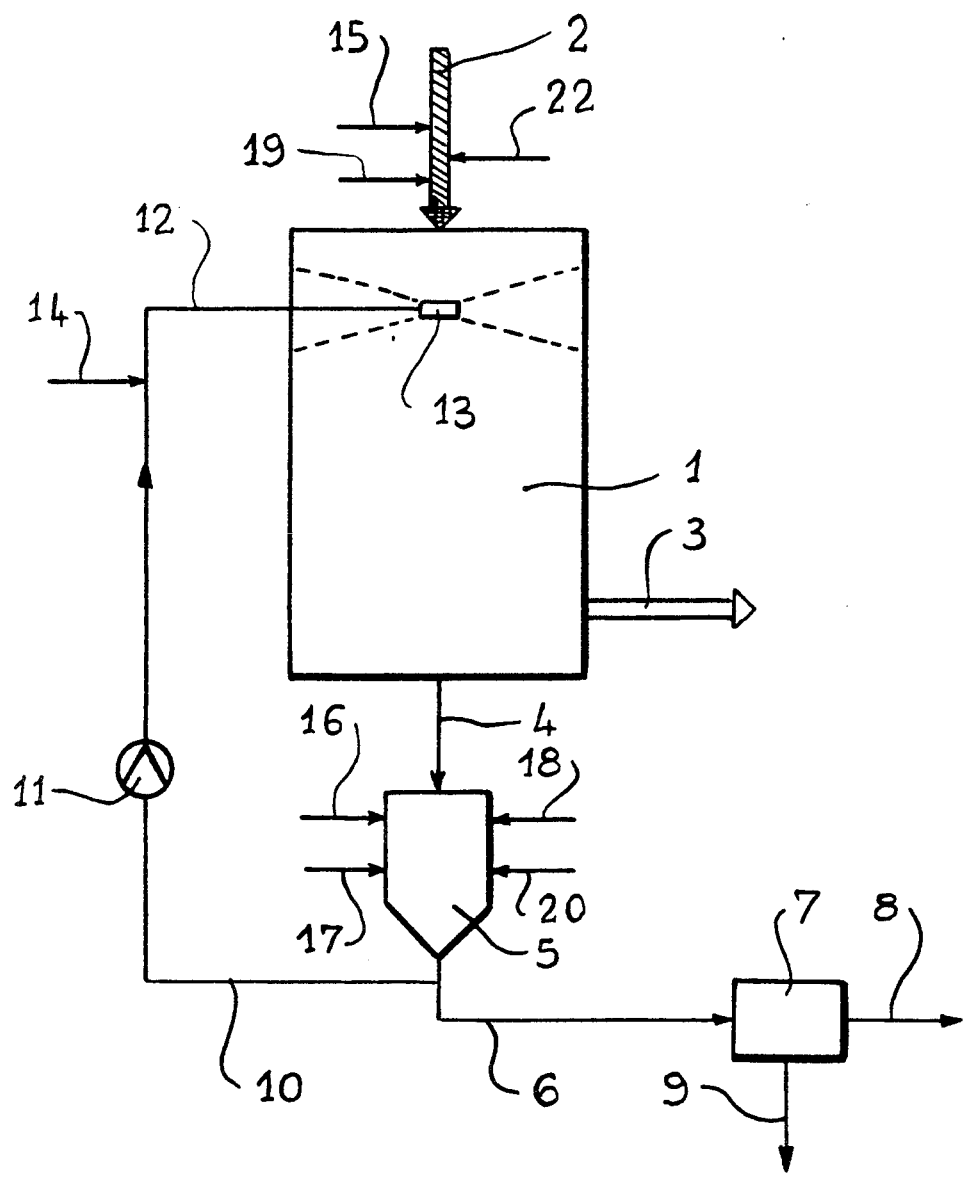

PROCESS FOR PURIFYING BY THE WET METHOD FUMES CONTAINING NITROGEN OXIDES

BACKGROUND OF THE INVENTION

1. Field of the Invention

The present invention relates to processes for purifying, by the wet method, fumes containing nitrogen oxides.

2. History of the Related Art

In such processes, a washing liquid is brought into contact with the fumes to be purified in a washer. The dust in suspension in the gases is transferred into the washing liquid and, at the same time, the gaseous pollutants are absorbed by the washing liquid depending on their solubility and the characteristics of the washing liquid. The flowrate of the latter necessary for purifying the fumes generally being high, the washing liquid is recycled in the washer with a portion thereof being drained to extract from the washer/recycling circuit trapped pollutants.

In the case of nitrogen oxides emitted by combustion processes, about 95% of the nitrogen oxides are in the form of nitrogen monoxide NO whose solubility is very low; and a simple method of washing, with a washing liquid containing lime or limestone as is conventionally carried out for sulfur oxides, does not enable the nitrogen oxides to be absorbed in a significant quantity, the proportion of nitrogen dioxide $NO_2$ rarely exceeding 5% of the total of the nitrogen oxides present. This is why different processes have been proposed for oxidizing the NO into $NO_2$ to thus allow the trapping thereof. All such processes employ an oxidant whose consumption may be much greater than that strictly necessary stoichiometrically due to the presence for example of dissolved sulfur dioxide which tends to be oxidized into sulfur trioxide. Another drawback of such processes is that nitrates are produced which pose a virtually insoluble problem concerning the treatment of the concentrated fluid being drained.

It is an object of the present invention to overcome these drawbacks by judiciously using the properties of the other pollutants trapped in the washer. Experience has surprisingly shown that the oxidation of NO and $NO_2$ may be combined with a reduction of $NO_2$ into $N_2$ due to the reducing properties of dissolved $SO_2$.

BRIEF DESCRIPTION OF THE DRAWINGS

The invention will be more readily understood on reading the following description with reference to the accompanying drawings, in which:

The single Figure schematically shows a circuit for carrying out the processes of the invention.

DESCRIPTION OF THE PREFERRED EMBODIMENT

According to the invention, the fumes 2 to be purified enter the washer 1 where they are contacted by recycled washing liquid 12 distributed in the gases by an appropriate device 13. They emerge from the washer purified at (3). The washing liquid 12 introduced into the washer 1, after contact with the gases, is recovered at (4) in a tank 5 which may be arranged in the base of the washer 1. An addition of liquid acid agent 16 may be made in tank 5 in the event of the fumes not bringing a sufficient quantity of acid agent to reduce the pH of the liquid to the level required. Similarly, an addition of neutralizing agent 17 is made to raise the pH of the liquid to the required level in the case of trapped fly-ash not contributing, itself, a sufficient quantity of alkalinity.

A part of the liquid 6 is directed to a treatment station 7. The pollutants are precipitated and separated in the form of a solid residue 9, while the clarified water 8 contains neutral salts generally posing no problem with respect to the natural medium. One of the objects of the invention is to avoid that such clarified water 8 contain nitrates as by-product of the absorption of the nitrogen oxides.

The greater part of the aqueous liquid 10 leaving tank 5 is returned to the washer by a recycling pump 11. After addition of an oxidation compound 14, for example sodium chlorite, the washing liquid 12 is brought into contact with the fumes. It then reacts with the gaseous acid agent 15, for example hydrochloric acid introduced into the fumes, in order to produce oxidizing agents which transform NO into $NO_2$. In many applications, the fumes also contain sulfur dioxide tending to be oxidized into sulfur trioxide, which increases the consumption of oxidizing agent. An intermediate agent introduced into the washing liquid, for example 18 in the recycling tank 5 or in the fumes 19, is oxidized by the $NO_2$ produced which is itself reduced to $N_2$. Subsequently, in the washing liquid, it is regenerated by reduction by the dissolved $SO_2$, itself oxidized to $SO_3$ and easily neutralized in the form of gypsum.

This method makes it possible to use the reducing potential of the $SO_2$ which is almost always present, while using an active reducer having a role of intermediate agent between the $NO_2$ and the $SO_2$. The element bromine may thus be used in the form of HBr without generating secondary effects detrimental to the environment. The introduction of the intermediate agent in the washing liquid may be effected by adding a bromine salt thereto.

If the fumes do not contain $SO_2$ in a sufficient quantity, according to the invention, there is introduced into the washing liquid a reducing agent 20 which prevents the transfer of the nitrogen oxides in the form of nitrates to the effluent being treated at 7, for example a sulfite or bisulfite. Alternatively, gaseous $SO_2$ (22) may be introduced into the fumes before contact with the washing liquid 12.

In the case of fumes emitted by a process of combustion, the introduction of the gaseous acid agent 15 may usefully result in the combustion, itself, of the fuel with or without additive. The same occurs for the introduction (22) of $SO_2$ in the fumes and for that of the intermediate agent 18 or 19.

The introduction of the oxidation compound in the washing liquid may be effected, completely or partly, by collection in this liquid after introduction in the fumes and before contact with such liquid.

It should be observed that, whenever, quantitatively, the washer 1 cannot ensure under good conditions the whole collection of the reducing agent and/or of the intermediate agent, the introduction into the washing loop will advantageously be effected by introduction, in the loop, of the drain of an additional washer provided downstream of washer 1 and operating under conditions different therefrom.

What is claimed is:

1. A process for purifying fumes resulting from a combustion process wherein the fumes contain nitrogen oxides and in which the fumes are purified to remove the nitrogen oxides by the wet method in a washer and wherein the fumes are scrubbed by recycling an aqueous washing liquid a portion of which is drained for removal of the pollutants trapped therein, wherein the process comprises the following combination of steps:

a) introducing into the washing liquid, before the introduction thereof into the washer to contact the fumes, an oxidation compound of sodium chlorite of which the products of reaction with an acid agent are oxidizing agents;

b) introducing into the fumes, before the introduction thereof into the washer to contact the washing liquid containing said oxidation compound therein, a hydrochloric acid agent which is easily soluble and which reacts with said oxidation compound and of which the product of reaction therewith is an oxidizing agent which converts NO to $NO_2$ as the fumes are contacted with the washing liquid within the washer;

c) introducing a reducing agent into the washing liquid so that the reducing agent is in the washing liquid when the fumes are contacted within the washer with said washing liquid while NO is converted to $NO_2$;

d) and introducing into the washing liquid an intermediate agent oxidizable by $NO_2$ so that nitrates are not formed and $NO_2$ is converted to $N_2$, and thereafter the oxidized form of the intermediate agent is regenerated from the oxidized form by reduction with said reducing agent as the fumes are contacted with the recycling washing liquid within the washer.

2. The process of claim 1, wherein said intermediate agent is hydrobromic acid.

3. The process of claim 1, wherein said intermediate agent is a bromine salt.

4. The process of claim 1, wherein said reducing agent is $SO_2$, said $SO_2$ being introduced into the fumes prior to the fumes being introduced into the washer.

5. The process of claim 1 in which the fumes are emitted as a by-product of a fuel combustion, wherein said reducing agent introduced into the fumes is a result of the combustion of said fuel.

6. A process for purifying fumes resulting from a combustion process wherein the fumes contain nitrogen oxides and in which the fumes are purified to remove the nitrogen oxides by the wet method in a washer and wherein the fumes are scrubbed by recycling an aqueous washing liquid a portion of which is drained for removal of the pollutants trapped therein, wherein the process comprises the following combination of steps:

a) introducing into the washing liquid, before the introduction thereof into the washer to contact the fumes, an oxidation compound of sodium chlorite of which the products of reaction with an acid agent are oxidizing agents;

b) introducing into the fumes, before the introduction thereof into the washer to contact the washing liquid containing said oxidation compound therein, a hydrochloric acid agent which is easily soluble and which reacts with said oxidation compound and of which the product of reaction therewith is an oxidizing agent which converts NO to $NO_2$ as the fumes are contacted with the washing liquid within the washer;

c) introducing a $SO_2$ reducing agent into the washing liquid so that the reducing agent is in the washing liquid when the fumes are contacted within the washer with said washing liquid while NO is converted to $NO_2$;

d) and introducing into the washing liquid an intermediate agent oxidizable by $NO_2$ so that nitrates are not formed and $NO_2$ is converted to $N_2$, and thereafter the oxidized form of the intermediate agent is regenerated from the oxidized form by reduction with said $SO_2$ reducing agent as the fumes are contacted with the recycling washing liquid within the washer.

7. The process of claim 6, wherein said intermediate agent is hydrobromic acid.

8. The process of claim 6, in which said intermediate agent is a bromine salt.

* * * * *